(No Model.)

S. V. JEFFORDS.
Cotton and Rice Planter.

No. 243,268. Patented June 21, 1881.

WITNESSES:
W. W. Hollingsworth
Colon S. Vernon

INVENTOR:
S. V. Jeffords
BY
ATTORNEYS.

UNITED STATES PATENT OFFICE.

STEPHEN V. JEFFORDS, OF PEARSON, GEORGIA.

COTTON AND RICE PLANTER.

SPECIFICATION forming part of Letters Patent No. 243,268, dated June 21, 1881.

Application filed April 19, 1881. (No model.)

*To all whom it may concern:*

Be it known that I, STEPHEN V. JEFFORDS, of Pearson, Coffee county, Georgia, have invented a new and useful Improvement in Cotton-Planters; and I do hereby declare that the following is a full, clear, and exact description of the same, reference being had to the accompanying drawings, forming part of this specification, in which—

Figure 1:
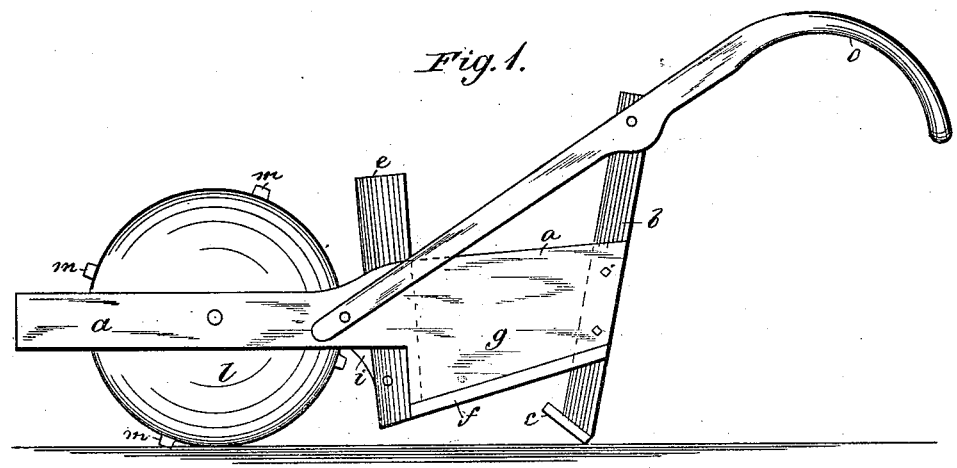
Figure 2:
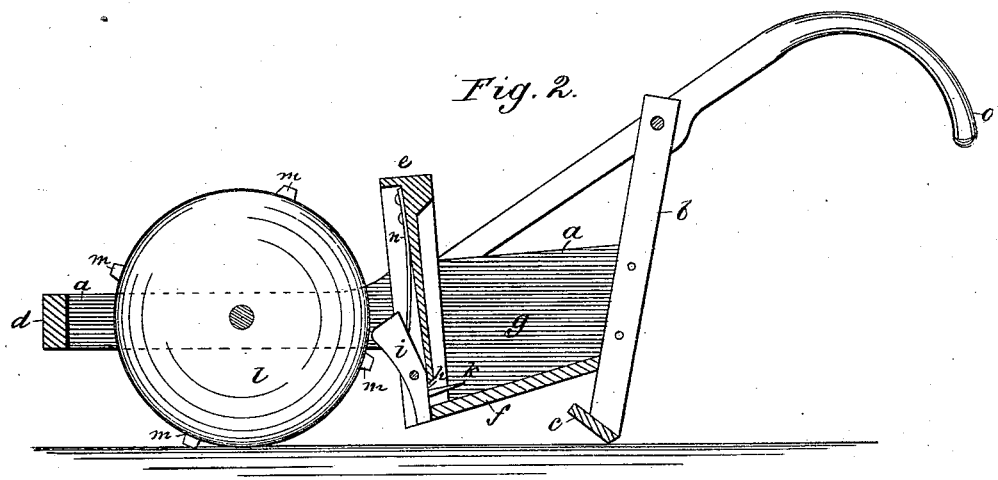

Figure 1 is a side elevation, and Fig. 2 is a vertical longitudinal section.

My invention relates to improvements in droppers for rice, cotton, and other seeds; and it consists in the peculiar construction and arrangement of the parts, as hereinafter more fully set forth.

In the accompanying drawings, $a$ $a$ represent the two side longitudinal pieces of the frame of my improved dropper. The side pieces, $a$, are bolted at their rear ends to the standard $b$ of an inclined coverer, $c$, and have recesses formed in their front parts, and their front ends secured to a block, $d$, thus leaving an open rectangular slot between them. An upright, $e$, grooved or recessed in its front and back face, is inserted between the sides $a$ of the frame, near its rear end, and the sides $a$ are bolted to the upright $e$, thus forming a hopper, $g$, in the rear end of the frame, having a bottom, $f$, inclined downwardly from rear to front, for the escape of seed through a hole, $h$, in the front lower end of the hopper. The opening $h$ for the passage of the seed from the hopper is closed by a gate, $i$, swinging in the recess in the front face of the upright $e$, and having its axis pivoted in the sides of said recess. The rear face of the gate $i$ is provided with a pin, $k$, projecting rearwardly from it and through the opening $h$ into the hopper, and acts as a stirrer to prevent the choking of the seed in the opening $h$ in the operation of the machine. The upper part of the gate $i$ is enlarged, so as to be struck in the revolution of the driving-wheel $l$ successively by each of a series of pins, $m$, arranged at the distance apart the seed is to be dropped on the circumference of the driving-wheel.

The distance apart of the pins $m$ on the circumference of the driving-wheel may be varied as desired for the escape of seed from the hopper, each pin in its revolution striking successively the enlarged end of the gate and opening it for the escape of the seed sliding down the inclined bottom of the hopper.

$n$ is a spring, having its upper end bolted in the upper end of the recess in the front face of the upright $e$, the lower free end of said spring bearing against the rear face of the enlarged end of the gate, so that in its normal position the gate is closed and is opened for the escape of seed successively by the pins $m$ in the revolution of the driving-wheel $l$.

$o$ $o$ are the handles secured to the side pieces, $a$, and to the standard of the coverer.

The dropper, in use, may be pushed forward by hand, the wheel running in a furrow made for the seed, or it may be operated by a horse.

The driving-wheel $l$ has its axle preferably journaled in journal-boxes fastened by screws to the under faces or edges of the sides $a$.

What I claim as my invention is—

The combination, with the recessed side pieces, $a$, forming the journal-bearings and guides for the driving-wheel and the sides of the hopper, coverer-standard $b$, and recessed upright $e$, having a seed-opening, $h$, in its lower end, of the pivoted gate $i$, having an enlarged upper end, and stirrer-pin $k$, spring $n$, and driving-wheel $l$, provided with pins $m$, substantially as described, and for the purpose set forth.

STEPHEN VANRANCELER JEFFORDS.

Witnesses:
J. E. B. LOVE,
HENRY LOVE.